(12) United States Patent
Suzuki (10) Patent No.: US 7,134,768 B2
(45) Date of Patent: Nov. 14, 2006

(54) LED LAMP WITH LIGHT GUIDE

(75) Inventor: Nobuyuki Suzuki, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 107 days.

(21) Appl. No.: 11/033,555

(22) Filed: Jan. 12, 2005

(65) Prior Publication Data

US 2005/0152141 A1    Jul. 14, 2005

(30) Foreign Application Priority Data

Jan. 13, 2004    (JP)    ............................. 2004-005675

(51) Int. Cl.
*F21V 1/00*    (2006.01)
*F21V 5/00*    (2006.01)

(52) U.S. Cl. ...................... 362/241; 362/331; 362/332; 362/334; 362/520; 362/521; 362/522

(58) Field of Classification Search ................ 362/241, 362/331–334, 520–522
See application file for complete search history.

(56) References Cited

U.S. PATENT DOCUMENTS

| | | | |
|---|---|---|---|
| 6,264,346 B1 * | 7/2001 | Pashley et al. | ............. 362/244 |
| 6,268,963 B1 * | 7/2001 | Akiyama | ..................... 359/631 |
| 6,332,701 B1 * | 12/2001 | Yamada et al. | ............. 362/517 |
| 6,469,755 B1 * | 10/2002 | Adachi et al. | ................ 349/62 |
| 6,811,277 B1 * | 11/2004 | Amano | ....................... 362/602 |
| 6,953,271 B1 * | 10/2005 | Aynie et al. | ................ 362/511 |
| 7,021,805 B1 * | 4/2006 | Amano et al. | ............. 362/518 |
| 7,070,301 B1 * | 7/2006 | Magarill | ..................... 362/241 |
| 2006/0139916 A1 * | 6/2006 | You et al. | .................... 362/231 |

FOREIGN PATENT DOCUMENTS

JP    2002-216510    8/2002

* cited by examiner

*Primary Examiner*—John Anthony Ward
*Assistant Examiner*—David Makiya
(74) *Attorney, Agent, or Firm*—Cermak & Kenealy LLP (57) ABSTRACT

Light emitted from a plurality of LED light sources can be introduced into a light guide and inwardly reflected (totally reflected) at a first reflective surface formed on the light guide to form a substantially collimated light. The substantially collimated light can then be inwardly reflected (totally reflected) at a second reflective surface and a third reflective surface. The light can then be led out of the light guide and emitted in a direction of illumination of the lamp. An increased amount of light provides a bright lamp. An arrangement of LEDs emitting different colored lights enables the different colored lights to be emitted at the same time or with time delays.

20 Claims, 4 Drawing Sheets

LED LAMP WITH LIGHT GUIDE

This application claims the priority benefit under 35 U.S.C. §119 of Japanese Patent Application No. 2004-005675 filed on Jan. 13, 2004, which is hereby incorporated by reference.

BACKGROUND OF THE INVENTION

1. Field of the Invention

The present invention relates to an LED lamp with a light guide. More particularly, it relates to an LED lamp with a light guide for use in vehicle, traffic and other automotive/transportation type lamps in general, such as rear combination lamps, rear fog lamps, reverse lamps, turn signal lamps, stop lamps, traffic signal lamps, and tail lamps. The LED lamp may also be used in playing machines, utility lamps, or amusement lamps in general, such as pinball machines, video games, dance lights, festival lights, flash lights, spot lights, game machines, etc.

2. Description of Related Art

Figure 6:
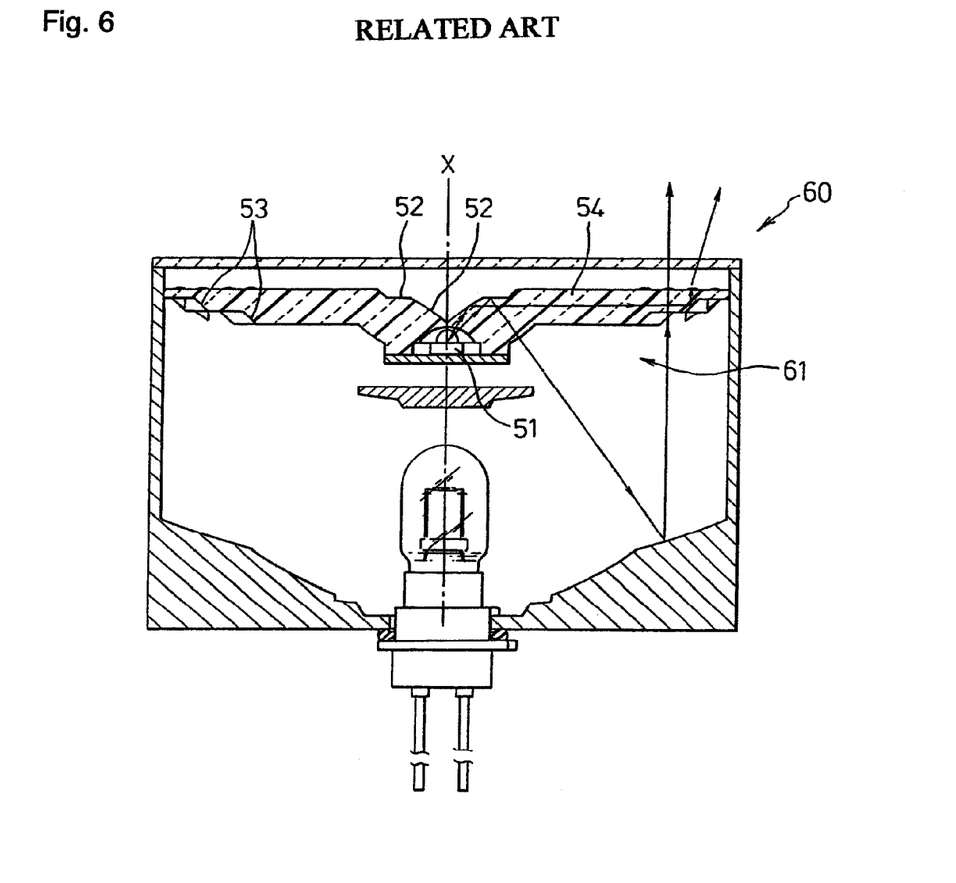
FIG. 6 is a cross-sectional view showing a related art lamp.

FIG. 6 shows a structure of an LED light emitting unit 61 and an optical system in a lamp 60 according to the related art. The lamp can include an LED 51 light source, regarded as a point source of light, and a light guide 54 having a light incident surface, a light exit surface, a primary reflective surface 52, and a secondary reflective surface 53 formed thereon. A light emitted from the light source enters the light guide 54 through the light incident surface formed on the light guide 54. The light is then guided through the light guide 54 toward the primary reflective surface 52. The light reflected at the primary reflective surface 52 is guided through the light guide 54 toward the secondary reflective surface 53. The light reflected at the secondary reflective surface 53 is guided through the light guide 54 toward the light exit surface and finally exits externally through the light exit surface, thus tracing an optical path.

The LED light emitting unit 61 in the lamp 60 is structured such that the light guide 54 is symmetrically formed about a point and the single LED 51 light source is located at the center thereof. The light emitted from the LED 51 and which enters the light guide 54 through the light incident surface is reflected at the primary reflective surface 52 radially toward the rim and guided through the light guide 54. Then, it is reflected at the secondary reflective surface 53, which is formed on a concentric circle centered on the optical axis X of the LED 51 light source, and emitted externally through the light exit surface. Therefore, the light released externally through the light exit surface of the light guide 54 has a substantially equal amount of light per unit area. Accordingly, the lamp has less variation in brightness and better visibility (see JP-A 2002-216510, for example).

The lamp with the LED light emitting unit described above disperses the light emitted from the single LED light source. Therefore, the amount of light per unit area released externally through the light exit surface of the light guide is small and accordingly the lamp has relatively low brightness. The single light source can not release lights of two or more types which limits the applicable range of the lamp.

SUMMARY OF THE INVENTION

The present invention has been made in consideration of the above and other problems and employs a light guide to achieve a bright lamp with a large amount of illumination and less variation in brightness, and which is capable of emitting a plurality of colored lights.

In accordance with an aspect of the present invention, an LED lamp can include a plurality of LED light sources arranged to emit respective lights, a light guide having a primary reflective surface, a secondary reflective surface and a tertiary reflective surface, and a reflector. The lamp can be configured such that a light emitted from each LED and which enters the light guide is reflected at the primary reflective surface, then the secondary reflective surface, and the tertiary reflective surface in turn, and exits from the light guide toward the reflector, which reflects the light toward a location substantially in the direction of illumination from the lamp, thus tracing an optical path. The light emitted from each LED and entering the light guide can be reflected at the primary reflective surface and substantially collimated to trace the optical path with the light substantially collimated at least partly until it is reflected at the tertiary reflective surface.

In the LED lamp according to an aspect of the invention, the primary reflective surface may be a paraboloidal curved surface having a focus on or close to the LED light source. The secondary reflective surface may be an oblique curved surface configured to receive the light reflected from the primary reflective surface and direct it toward the tertiary reflective surface provided at a location substantially in the direction of illumination from the lamp. The tertiary reflective surface may be an oblique curved surface configured to receive the light reflected from the secondary reflective surface and direct it toward the reflector provided around the tertiary reflective surface. The reflector can be an oblique curved surface configured to receive the light reflected from the tertiary reflective surface and to direct it toward a location substantially in the direction of illumination from the lamp.

In the LED lamp in accordance with an aspect of the invention, the light emitted from the LED light sources may include lights of all the same type or lights of two or more types. For example, lights of different color, different power, different intensity, different style, etc. can be used.

In the LED lamp, the LED light sources may include groups of LEDs and each group of LEDs that can emit the same type of light can be individually controlled such that they can be turned on and off (or powered) individually.

In the LED lamp, the light guide (4) may include a first light guide portion (4a) formed at an angle to the direction of illumination, and a second light guide portion (4b) formed in parallel or nearly parallel with the direction of illumination. The first light guide portion (4a) can include the primary reflective surface. The second light guide portion (4b) can include the tertiary reflective surface and protrude toward the front in the direction of illumination relative to the first light guide portion (4a).

The LED lamp with the light guide can be configured such that the light emitted from each LED light source and entering the light guide is inwardly reflected (totally reflected) and guided through the light guide to the tertiary reflective surface formed on the light guide. Therefore, it is possible to reduce guide loss in light and improve the available efficiency of light. As a result, a bright lamp with a large amount of illumination can be achieved. The LEDs may be divided into plural groups each including LEDs emitting respective lights of the same type to allow the single lamp to emit light of plural types. In addition, on/off or power controlling lights of the same type on an LED group basis enables the lamp to release different colored lights depending on time. Such a lamp can express surprise and provide a novel experience to interest viewers.

In accordance with another aspect of the invention, an LED lamp having a direction of illumination can include a plurality of LED light sources, a light guide located adjacent the LED light sources, a first light guide portion that is elongate in a direction that is angled with respect to the direction of illumination of the lamp, and a second light guide portion that is elongate in a direction that is at an angle with respect to elongate direction of the first light guide portion. The first light guide portion can be configured to receive light emitted from the plurality of LED light sources, to substantially collimate the received light into a first collimated light that travels in a first direction, and to change the direction of the first collimated light into a second different direction as second collimated light. The second light guide portion can be configured to receive the second collimated light and to change the direction of the second collimated light into a third different direction as third light. A reflector can be located adjacent to the light guide and configured to receive the third light and reflect the third light into another direction different from the third direction and substantially parallel to the illumination direction of the lamp.

The LED lamp can include a light guide that has a primary reflective surface configured to collimate the light received from the LED light sources into the first direction, a secondary reflective surface configured to reflect the first light into the second different direction, and a tertiary reflective surface configured to reflect the second light into the third different direction.

BRIEF DESCRIPTION OF THE DRAWINGS

These and other features and advantages of the invention will become clear from the following description of exemplary embodiments and with reference to the accompanying drawings, wherein.

DETAILED DESCRIPTION OF PREFERRED EMBODIMENTS

In lamps using an LED as a light source, a bright lamp with a large amount of illumination and an ability to release a plurality of differently colored lights can be attained by using at least one LED light source, a light guide, and a reflector.

Exemplary embodiments of the present invention will now be described in detail with reference to FIGS. 1–5. The embodiments described below are examples of the present invention, which are provided with various technical features. However, the scope of the present invention should not be considered limited to these exemplary embodiments.

Figure 1:
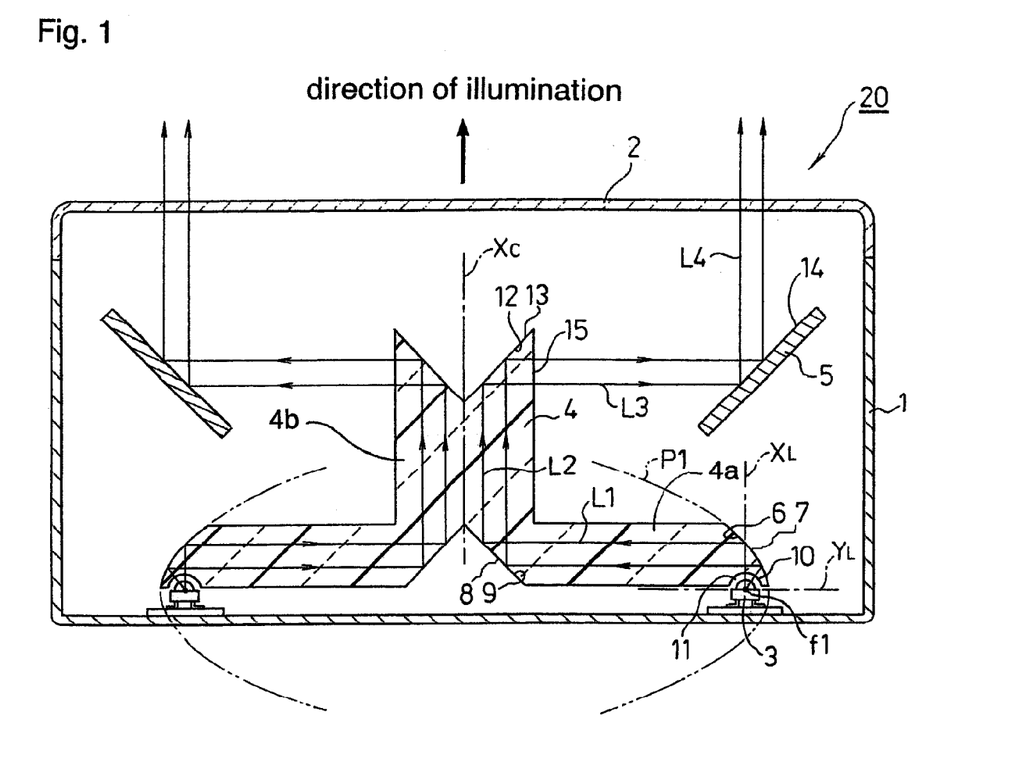
FIG. 1 is a cross-sectional view of an embodiment of an LED lamp with a light guide made in accordance with the principles of the invention.
Figure 2:
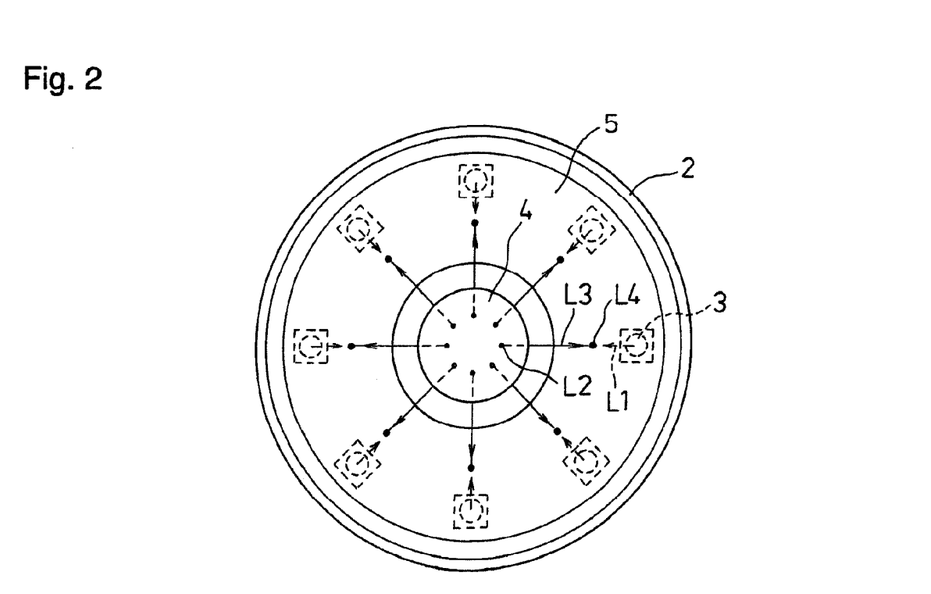
FIG. 2 is a top view of the LED lamp with the light guide of FIG. 1.

FIG. 1 is a cross-sectional view of an LED lamp with a light guide according an embodiment of the invention. FIG. 2 is a top view of the LED lamp with the light guide of FIG. 1. The lamp 20 can include a housing 1, a lens 2, a plurality of LEDs 3, a light guide 4, and a reflector 5. The configuration of the lens 2, the LEDs 3, the light guide 4 and the reflector 5 forms an optical system.

The light guide 4 can be shaped such that it is substantially rotationally symmetrical about the central axis $X_C$ and can include a first light guide portion 4a formed at an angle with respect to the direction of illumination from the lamp 20, and a second light guide portion 4b formed in parallel or nearly parallel with the direction of illumination of the lamp 20. The second light guide portion 4b can be configured such that it protrudes toward the front of the lamp in the direction of illumination relative to the first light guide portion 4a. The light guide 4 can be provided with a primary reflective surface 6, a secondary reflective surface 8 and a tertiary reflective surface 12 formed thereon. The first light guide portion 4a can include the primary reflective surface 6 formed thereon. The second light guide portion 4b can include the tertiary reflective surface 12 formed thereon. A plurality of LEDs 3 can be arranged about a circle centered on the central axis $X_C$ while the optical axis $X_L$ of the LEDs 3 can be configured to be substantially parallel to the direction of illumination from the lamp 20. The primary reflective surface 6 can be formed on the light guide 4 such that it is located in front of and almost/substantially in the direction of emission from the LED 3 to reflect the light emitted from the LED 3 at the inner surface toward a sideward direction.

The primary reflective surface 6 can be formed as a paraboloidal curved surface 7 based on a parabola P1. The parabola P1 can have a focus f1 on or close to the LED 3 and an axis $Y_L$ that is a straight line perpendicular to the optical axis $X_L$ of the LED 3. The parabola P1 can also be shaped such that it is open toward the central axis $X_C$ of the light guide 4. Revolution of the parabola P1 about the central axis $X_C$ of the light guide 4 preferably forms the paraboloidal curved surface 7. The paraboloidal curved surface 7 may be formed on the front and the rear in the direction of emission from the LED 3. The portion of the paraboloidal curved surface 7 that is formed behind the focus f1 may be omitted when it is preferred that the LED 3 emit light only in a forward direction.

The light emitted from each LED 3 can enter the light guide 4 through a light incident surface 10, which may be shaped in the form of a substantially hemispheric recess centered on the focus f1. This form is effective to prevent the optical path from varying when the light entering the light guide 4 is refracted due to a difference in refractive index between an atmospheric layer 11 and the light guide 4.

The secondary reflective surface 8 can be formed as a recessed oblique curved surface 9 that can be defined by a line that is revolved about the central axis $X_C$ and which closes toward the central axis $X_C$ in the direction of illumination from the lamp 20. In FIG. 1, the angle of the straight line tilted with respect to the central axis $X_C$ is about 45°, which serves to reflect the received light and re-direct it along a direction that differs by an angle of about 90° from its original direction.

The tertiary reflective surface 12 can be formed as a recessed oblique curved surface 13 that can be defined by a line that is revolved about the central axis $X_C$ and which opens away from the central axis $X_C$ of the light guide 4 in the direction of illumination from the lamp 20. In FIG. 1, the angle of the straight line that is tilted to the central axis $X_C$ is about 45°, which serves to reflect the received light and re-direct it along a direction that differs by an angle of about 90° from its original direction.

The reflector 5 can be located about the tertiary reflective surface 12. The reflector 5 can be formed as a recessed oblique curved surface 14 by revolving a line about the central axis $X_C$ and the rotated surface opening outward in a direction of illumination from the lamp 20. In this case, the angle of the straight line tilted with respect to the central axis $X_C$ is about 45°, which serves to reflect the received light and re-direct it along a direction that is changed by an angle of about 90°.

The housing 1 and the lens 2 can surround the configuration of the LEDs 3, the light guide 4, and the reflector 5 described above to form the lamp 20.

The following description provides details of an example of the optical system in the lamp configured as shown in FIG. 1. The light emitted from the LED 3 (both forward and obliquely forward in the direction of the optical axis $X_L$) enters the light guide 4 through the light incident surface 10 thereof located at the front of and in the direction of the optical axis $X_L$ of the LED 3. The light can then be guided through the light guide 4 to the primary reflective surface 6 that can be composed of the paraboloidal curved surface 7. The light incident surface 10 can be formed in a substantially hemispheric recess centered on the focus f1. Accordingly, the light emitted from the LED 3 can advance straight to the primary reflective surface 6 in the light guide 4 regardless of the difference in refractive index between the atmospheric layer 11 and the light guide 4. The primary reflective surface 6 can be formed in the paraboloidal curved surface 7, which has a focus f1 close to the LED 3. The paraboloidal curved surface 7 as shown also has an axis $Y_L$ that is a straight line substantially perpendicular to the optical axis $X_L$ of the LED 3, and has a shape that is open toward the central axis $X_C$ of the light guide 4. Accordingly, the light received at the primary reflective surface 6 is inwardly reflected to form a substantially collimated light L1, which travels toward the secondary reflective surface 8 formed at a location along the central axis $X_C$ of the light guide 4.

The substantially collimated light L1 traveling toward the secondary reflective surface 8 can be guided by and through the light guide 4 to the secondary reflective surface 8. The secondary reflective surface 8 can be formed in the recessed oblique curved surface 9 that forms an angle of about 45° with respect to the central axis $X_C$ of the light guide 4. Accordingly, the substantially collimated light L1 that is received at the secondary reflective surface 8 can be inwardly/upwardly reflected at the secondary reflective surface 8 and redirected by an angle of about 90° toward the tertiary reflective surface 12 as a substantially collimated light L2.

The tertiary reflective surface 12 can be formed in the recessed oblique curved surface 13, which is provided at a location downstream in the direction of illumination from the lamp 20 relative to the secondary reflective surface 8. The oblique curved surface 13 can be formed at an angle of about 45° with respect to the central axis $X_C$ of the light guide 4. Accordingly, the substantially collimated light L2 traveling toward the tertiary reflective surface 12 can be guided through the light guide 4 to the tertiary reflective surface 12. The tertiary reflective surface 12 can be configured to inwardly reflect and redirect the light at an angle of about 90° with respect to the central axis $X_C$ toward the light exit surface 15 of the light guide 4 as a substantially collimated light L3. The light L3 can then be emitted from the light exit surface 15 into the atmosphere toward the reflector 5.

The reflector 5 can be located about the tertiary reflective surface 12 and formed as a recessed oblique curved surface 14 that is open at an angle of about 45° with respect to the direction of illumination of the lamp 20 and relative to the central axis $X_C$ of the light guide 4. Accordingly, the substantially collimated light L3 released from the light guide 4 into the atmosphere toward the reflector 5 can be guided through the atmosphere to the reflector 5. The light can then be redirected at the reflector 5 by an angle of about 90° to travel along the direction of illumination from the lamp 20 as a substantially collimated light L4, which is transmitted through the lens 2 and emitted from the front of the lamp 2.

The light traveling to the inner surface of the lens includes the substantially collimated light L4. Therefore, a lens-cut pattern may be applied to the lens to relatively easily achieve a desired light distribution. Useless light not contributing to the light distribution can be reduced to improve the available efficiency of light.

Figure 3:
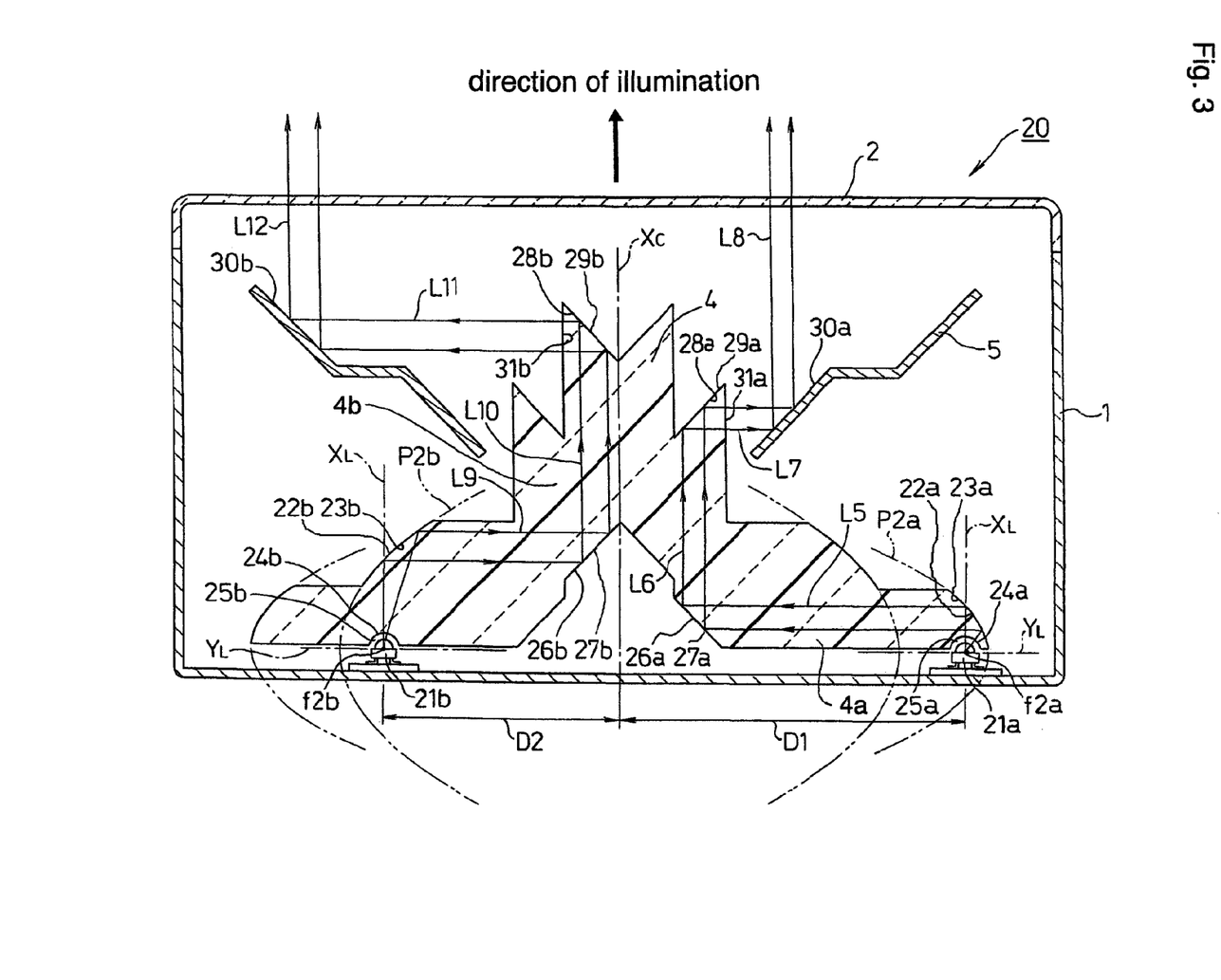
FIG. 3 is a cross-sectional view of another embodiment of an LED lamp with a light guide made in accordance with the principles of the invention.
Figure 4:
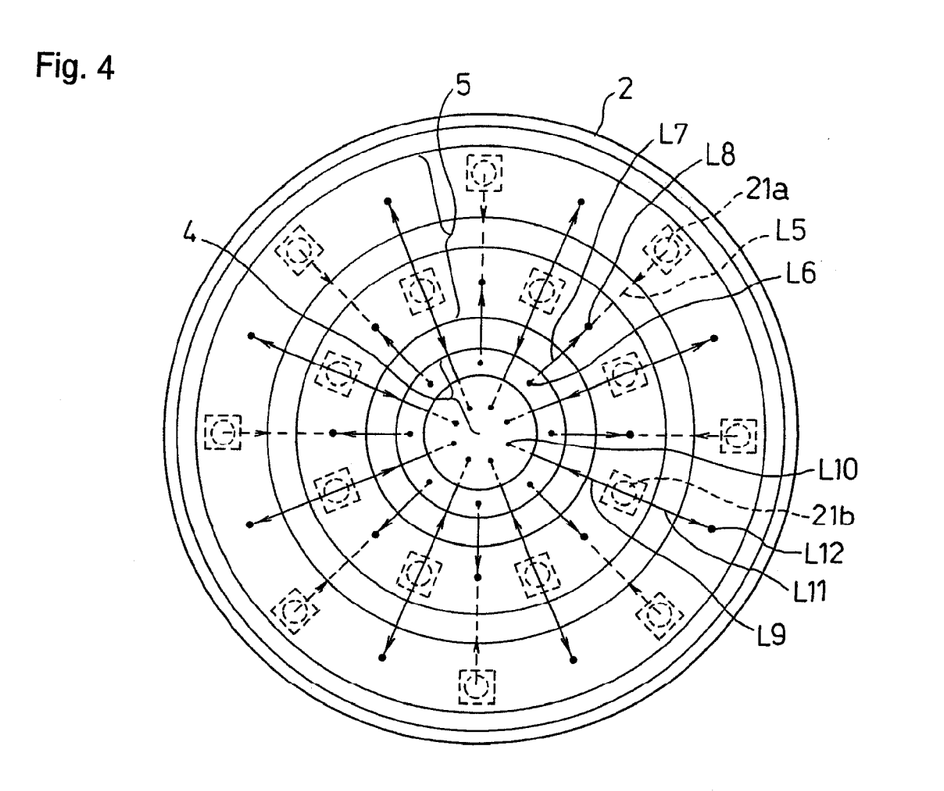
FIG. 4 is a top view of the LED lamp with the light guide of FIG. 3.

FIG. 3 is a cross-sectional view of another embodiment of an LED lamp with a light guide made in accordance with the principles of the invention. FIG. 4 is a top view of the LED lamp with the light guide of FIG. 3. The embodiment can include a housing, a lens, a plurality of LEDs, a light guide, and a reflector employed as components of the lamp. The light guide can be shaped to be rotationally symmetrical about the central axis $X_C$ and can be provided with a primary reflective surface, a secondary reflective surface and a tertiary reflective surface formed thereon. Light that is emitted from the LED light source and enters the light guide can be reflected at the primary reflective surface, the secondary reflective surface, and the tertiary reflective surface in turn. The light reflected at the tertiary reflective surface can then exit into the atmosphere. The light can be reflected at the reflector toward the lens, then through the lens to illuminate a location substantially in the direction of illumination from the lamp, thus tracing an optical path. The optical path can be similar to the embodiment described above with respect to FIG. 1 except that the light can be configured to trace the optical path in two different ways while being emitted from the LED light sources.

In a more detailed description of this embodiment, the light guide 4 can be shaped to be substantially rotationally symmetrical about the central axis $X_C$ and can include a first light guide portion 4a formed at an angle to the direction of illumination from the lamp 20, and a second light guide portion 4b formed in parallel or nearly parallel with the direction of illumination. The second light guide portion 4b can protrude toward the front of the lamp and in the direction of illumination relative to the first light guide portion 4a. The light guide 4 can be provided with the primary reflective surface, the secondary reflective surface and the tertiary reflective surface formed thereon. The first light guide portion 4a can include the primary reflective surface formed thereon. The second light guide portion 4b can include the tertiary reflective surface formed thereon. A group of LED light sources 21a and a group of LED light sources 21b can be arranged at different distances D1 and D2, respectively, from the central axis $X_C$ of the light guide 4 toward the rim. The LED light sources 21a and 21b can have an optical axis $X_L$ substantially along the direction of illumination from the lamp 20. A first primary reflective surface 22a and a second primary reflective surface 22b can be formed on the light guide 4 and located at the front and in the direction of respective emission from the LED light sources 21a and 21b to direct the light emitted from each of the LED lights sources 21a and 21b toward the side.

The first primary reflective surface 22a can be formed as a paraboloidal curved surface 23a based on a parabola P2a. The parabola P2a can have a focus f2a located close to the LED 21a and an axis $Y_L$ that is a straight line perpendicular to the optical axis $X_L$ of the LED 21a. The parabola P2a can have a shape that is opened toward the central axis $X_C$ of the light guide 4. In this embodiment, revolution of the parabola P2a about the central axis $X_C$ of the light guide 4 forms the paraboloidal curved surface 23a. The paraboloidal curved surface 23a may be formed on the front and the rear in the direction of emission from the LED 21a. The portion of the paraboloidal curved surface 23a formed behind the focus f2a can be omitted when it is desired that the LED 21a emit only in a forward direction.

Similarly, the second primary reflective surface 22b can be formed as a paraboloidal curved surface 23b based on a parabola P2b. The parabola P2b can have a focus f2b located close to the LED 21b and can have an axis $Y_L$ that is a straight line perpendicular to the optical axis $X_L$ of the LED 21b. The parabola P2b can have a shape that is opened toward the central axis $X_C$ of the light guide 4. In this embodiment, revolution of the parabola P2b about the central axis $X_C$ of the light guide 4 forms the paraboloidal curved surface 23b. The paraboloidal curved surface 23b may be formed on the front and the rear in the direction of emission from the LED 21b. The portion of the paraboloidal curved surface 23b formed behind the focus f2b can be omitted when it is desired that the LED 21b emit only in a forward direction.

With regard to the paraboloidal curved surfaces 23a and 23b, the first primary reflective surface 22a can be formed at a location farther from the lens 2 of the lamp 2 and the second primary reflective surface 22b can be formed at a location closer to the lens 2. The second primary reflective surface 22b can be a greater distance from the apex of the paraboloidal curved surface to the focus than the first primary reflective surface 22a. In other words, the second primary reflective surface 22b can include a paraboloidal curved surface that is opened wider.

The light emitted from each of the LED light sources 21a, 21b can enter the light guide 4 through a light incident surface 24a, 24b, respectively, each of which may be shaped in the form of a partial hemispheric recess centered on the foci f2a, f2b. This form is effective to prevent the optical path from varying when the light entering the light guide 4 is refracted due to a difference in refractive index between an atmospheric layer 25a, 25b and the light guide 4.

The secondary reflective surface can include a first secondary reflective surface 26a and a second secondary reflective surface 26b. They can be formed as recessed oblique curved surfaces 27a and 27b by revolving a straight line about the central axis $X_C$ such that the surfaces 27a and 27b are angled toward the direction of illumination from the lamp 20 and angled relative to the central axis $X_C$ of the light guide 4. In this embodiment, the angle of the straight line with respect to the central axis $X_C$ can be about 45°, which serves to inwardly reflect the received light and re-direct it along a direction that is changed by an angle of about 90° with respect to the original direction.

With regard to the positional relation between the first secondary reflective surface 26a and the second secondary reflective surface 26b, the first secondary reflective surface 26a can be formed at a location farther from the lens 2 of the lamp 2. The second secondary reflective surface 26b can thus be formed at a location closer to the lens 2.

The tertiary reflective surface can include a first tertiary reflective surface 28a and a second tertiary reflective surface 28b. They can be formed as recessed oblique curved surfaces 29a and 29b by revolving a straight line about the central axis $X_C$ such that the resulting surface is open toward the direction of illumination from the lamp 20 and angled relative to the central axis $X_C$ of the light guide 4. In this embodiment, the angle of the straight line that is tilted with respect to the central axis $X_C$ can be about 45°, which serves to inwardly reflect the received light and re-direct it along a direction that differs by an angle of about 90° with respect to its original direction.

With regard to the positional relation between the first tertiary reflective surface 28a and the second tertiary reflective surface 28b, the second tertiary reflective surface 28b can be formed at a location closer to the central axis $X_C$ of the light guide 4. The first tertiary reflective surface 28a can thus be formed at the rim of the second tertiary reflective surface 28b relative to the central axis $X_C$.

The reflector 5 can be located about the first tertiary reflective surface 28a and the second tertiary reflective surface 28b. The reflector 5 can be formed as recessed oblique curved surfaces 30a and 30b that can be defined by revolving a straight line about the central axis $X_C$, the straight line being inclined such that the resulting surface is opened toward the direction of illumination from the lamp 20 relative to the central axis $X_C$ of the light guide 4. In this embodiment, the angle of the straight line with respect to the central axis $X_C$ can be about 45°, which serves to reflect the received light and re-direct it along a direction that differs by an angle of about 90° from the original direction of the light.

The housing 1 and the lens 2 can surround the group of LED light sources 21a, the group of LED sources 21b, the light guide 4 and the reflector 5 described above to form the lamp 20. The group of LED light sources 21a and the group of LED light sources 21b may include LEDs that emit lights of the same type or LEDs that emit light of different types per group.

The following description provides details of an example of the optical system in the lamp configured as shown in FIG. 3. The light emitted from the group of LEDs 21a (in a direction forward and obliquely forward in the direction of the optical axis $X_L$) can enter the light guide 4 through the light incident surface 24a thereof which is located is front of and in the direction of the optical axis $X_L$ of the LED 21a. The light can then be guided through the light guide 4 to the first primary reflective surface 22a composed of the paraboloidal curved surface 23a. The light incident surface 24a can be formed in the substantially hemispheric recess centered on the focus f2a. Accordingly, the light emitted from the LED 21a can advance straight to the first primary reflective surface 22a in the light guide 4 regardless of the difference in refractive index between the atmospheric layer 25a and the light guide 4. The first primary reflective surface 22a can be formed in the paraboloidal curved surface 23a. The paraboloidal curved surface 23a can include a focus f2a close to the LED 21a, an axis $Y_L$ that is a straight line perpendicular to the optical axis $X_L$ of the LED 21a, and can have a shape that is open toward the central axis $X_C$ of the light guide 4. Accordingly, the light received at the first primary reflective surface 22a can be inwardly reflected to form a substantially collimated light L5, which travels toward the first secondary reflective surface 26a formed at a location along the central axis $X_C$ of the light guide 4.

The substantially collimated light L5 traveling toward the first secondary reflective surface 26a can be guided by and through the light guide 4 to the first secondary reflective surface 26a. The first secondary reflective surface 26a can be formed in the recessed oblique curved surface 27a that is at an angle of about 45° and inclined toward the direction of illumination of the lamp 20 and relative to the central axis $X_C$ of the light guide 4. Accordingly, the substantially collimated light L5 received at the first secondary reflective surface 26a can be inwardly reflected at the first secondary reflective surface 26a and redirected at an angle of about 90° toward the first tertiary reflective surface 28a as a substantially collimated light L6.

The first tertiary reflective surface 28a can be provided at a location closer to the lens 2 of the lamp 20 and on a concentric circle having substantially the same radius about the central axis $X_C$ as that of the first secondary reflective surface 26a. The first tertiary reflective surface 28a can be formed in the recessed oblique curved surface 29a and be formed to be open at an angle of about 45° with respect to the central axis $X_C$ of the light guide 4 and inclined toward the direction of illumination from the lamp 20. Accordingly, the substantially collimated light L6 traveling toward the first tertiary reflective surface 28a can be guided by and through the light guide 4 to the first tertiary reflective surface 28a and can be inwardly reflected at the first tertiary reflective surface 28a. The light L6 can be redirected by an angle of about 90° toward the light exit surface 31a of the light guide 4 and exits as a substantially collimated light L7, which exits the light exit surface 31a into the atmosphere toward the reflector 5.

The reflector 5 can be located about the first tertiary reflective surface 28a and the second tertiary reflective surface 28b. The reflector 5 can include a recessed oblique curved surface 30a that is formed at an angle of about 45° relative to the central axis $X_C$ of the light guide 4 and open toward the direction of illumination from the lamp 20. Accordingly, the substantially collimated light L7 emitted from the light guide 4 into the atmosphere toward the reflector 5 can be guided through the atmosphere to the reflector 5. The light can then be redirected by the reflector 5 at an angle of about 90° to travel along the direction of illumination from the lamp 20 as a substantially collimated light L8, which is transmitted through the lens 2 toward the front of the lamp.

On the other hand, the light emitted from the group of LEDs 21b (both forward and obliquely forward in the direction of the optical axis $X_L$) can be directed to enter the light guide 4 through the light incident surface 24b located in front of the LED 21b and in the direction of the optical axis $X_L$. The light can then be guided through the light guide 4 to the second primary reflective surface 22b that includes the paraboloidal curved surface 23b. The light incident surface 24b can be formed as a substantially hemispheric recess centered on the focus f2b. Accordingly, the light emitted from the LED 21b can advance straight to the second primary reflective surface 22b in the light guide 4 regardless of the difference in refractive index between the atmospheric layer 25b and the light guide 4. The second primary reflective surface 22b can be formed in the paraboloidal curved surface 23b, which has a focus f2b located close to the LED 21b, a central axis $Y_L$ that is a straight line perpendicular to the optical axis $X_L$ of the LED 21b, and a shape that is open toward the central axis $X_C$ of the light guide 4. Accordingly, the light received at the second primary reflective surface 22b can be inwardly reflected to form a substantially collimated light L9, which travels toward the second secondary reflective surface 26b formed at a location along the central axis $X_C$ of the light guide 4.

The substantially collimated light L9 traveling toward the second secondary reflective surface 26b can be guided by and through the light guide 4 to the second secondary reflective surface 26b. The second secondary reflective surface 26b can be formed in the recessed oblique curved surface 27b and at an angle of about 45° with respect to the central axis $X_C$ of the light guide 4 such that the surface is open in a direction opposite the direction of illumination from the lamp 20. Accordingly, the substantially collimated light L9 that is received at the second secondary reflective surface 26b can be inwardly reflected at the second secondary reflective surface 26b and redirected by an angle of about 90° toward the second tertiary reflective surface 28b as a substantially collimated light L10.

The second tertiary reflective surface 28b can be provided at a location closer to the lens 2 of the lamp 20 than the second secondary reflective surface 26b and can be located on a concentric circle having substantially the same radius about the central axis $X_C$ as that of the second secondary reflective surface 26b. The second tertiary reflective surface 28b can be formed in the recessed oblique curved surface 29b such that it forms an angle of about 45° with respect to the central axis $X_C$ of the light guide 4 and is concave/open in the direction of illumination of the lamp 20. Accordingly, the substantially collimated light L10 traveling toward the second tertiary reflective surface 28b can be guided by and through the light guide 4 to the second tertiary reflective surface 28b and can be inwardly reflected at the second tertiary reflective surface 28b. The light L10 can be redirected by an angle of about 90° toward the light exit surface 31b of the light guide 4 as a substantially collimated light L11, which is then emitted from the light exit surface 31b into the atmosphere toward the reflector 5.

The reflector 5 can be located about the first tertiary reflective surface 28a and the second tertiary reflective surface 28b. The reflector 5 can include the recessed oblique curved surface 30b that is inclined at an angle of about 45° to the central axis $X_C$ of the light guide 4 such that the reflector 5 is open toward the direction of illumination from the lamp 20. Accordingly, the substantially collimated light L11 emitted from the light guide 4 into the atmosphere toward the reflector 5 can be guided through the atmosphere to the reflector 5. The light L11 can be redirected at the reflector 5 by an angle of about 90° to travel along the direction of illumination from the lamp 20 as a substantially collimated light L12, which can be emitted from the lens 2 out of the front of the lamp.

The light traveling to the inner surface of the lens can include the substantially collimated lights L8 and L12. Therefore, a lens-cut may be applied to the lens to relatively easily achieve a desired light distribution. Useless light not contributing to the light distribution can be reduced to improve the available efficiency of light.

The above-described embodiments show optical systems in which the light emitted from the LED enters the light guide and is reflected at the primary reflective surface to trace an optical path with the light that is substantially collimated until it reaches the lens surface. However, the light that enters the lens is not always required to be light that is substantially collimated. The optical system can be configured such that it allows light to reach the lens surface at an appropriate incident angle in consideration of tradeoffs among the quality of the distribution of light emitted from the lens and other restrictive conditions in designing and producing the lens. The optical system can be configured such that the light is substantially collimated (at least until the light entering the light guide and reflected at the primary reflective surface is guided through the light guide and reaches the tertiary reflective surface formed on the light guide). This configuration is effective to reduce the loss of light in the light guide and to improve the available efficiency of light.

Figure 5:
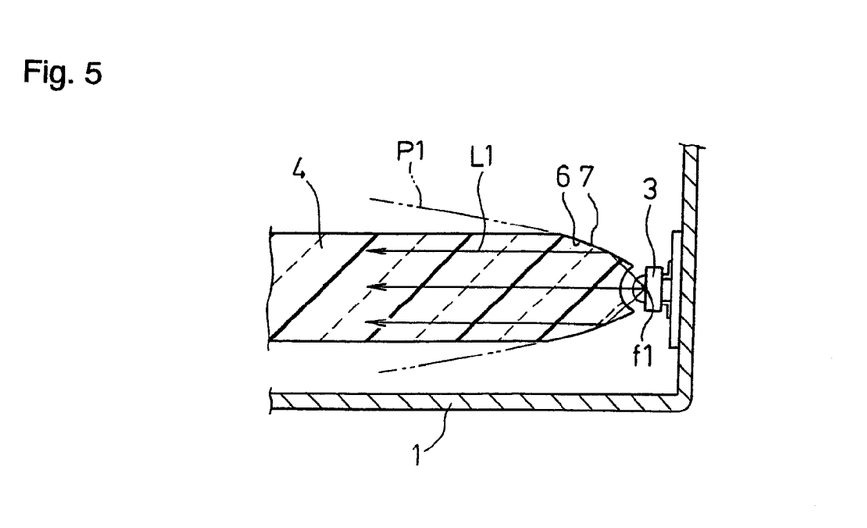
FIG. 5 is a partial cross-sectional view of another embodiment of an LED arrangement in an LED lamp with light guide made in accordance with the principles of the present invention.

Similarly, in the embodiments described above, the main direction of emission from the LED light sources is substantially the same as the direction of illumination from the lamp. Alternatively, the main direction of emission from the LED light sources may be normal to the direction of illumination from the lamp as shown in FIG. 5. In this embodiment, the LED 3 light source can be located substantially on the focus f1 of the primary reflective surface 6, and the primary reflective surface 6 can include a paraboloidal curved surface 7. The light reflected at the primary reflective surface 6 travels toward the secondary reflective surface (not shown) as a substantially collimated light L1. The different possibilities in the selection of the LED arrangement direction increases the design flexibility to achieve a desired size and shape of the lamp, providing a configuration capable of supporting design-emphasized lamps.

LEDs with different emission colors may be arranged for "on/off-controlling" or "power controlling" on an emission color basis. As a result, it is possible to emit a plurality of lights from a single lamp and provide a lamp capable of changing the light emitted therefrom depending on time.

As described above, the LED lamp with the light guide can employ a number of LEDs in the light source to achieve a brighter lamp with an increased amount of light emitted therefrom. As the light emitted from the LED light source enters the light guide and is inwardly reflected to the reflector, the lamp can be configured to reduce the guide loss in light and increase the available efficiency of light. A dense arrangement of LEDs can be arranged to illuminate in concentric circles with different radii, each circle formed as a continuous line, to provide an appealing lamp from a viewer's perspective. The light emitted from different LED light sources may not all be of the same type. Alternatively, they may be configured in plural groups, each LED group emitting lights of the same type, to emit lights of plural types from a single lamp. In addition, "on/off-controlling" or "power controlling" of each LED group emitting lights of the same type may create a surprising and/or novelty effect. Displacement of the reflector in a direction substantially perpendicular to the direction of illumination from the lamp enables the circular light to be located closer to or farther from the center of the lamp. Similarly, distances between the concentric circles of light may be controlled to change the light emission pattern from the lamp and contribute to optimization of the appearance and light distribution. In addition, other geometrical configuration can be used instead of circles. For example, ovals, squares, non-symmetrical shapes and other geometrical shapes can be formed by the lamp. These different geometrical shapes can be layered "concentric" shapes as described above with respect to the concentric circles. As the light received at the inner surface of the lens of the lamp can be substantially collimated, the lens-cut applied to the lens to satisfy a certain light distribution can be relatively easily designed. Accordingly, it is possible to reduce the time consumed in designing the lens and thus decrease the production cost for the lamp. Further, when LEDs are not turned on in daylight, the LED light source may not be directly visible. Instead, the lamp can be configured such that the reflective surface of the reflector is viewable during daylight hours. This design is effective to achieve a gorgeous and bright lamp that has a nice appearance.

Having described exemplary embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An LED lamp, comprising:
a plurality of LED light sources arranged to emit light;
a light guide located adjacent the LED light sources and having a primary reflective surface, a secondary reflective surface and a tertiary reflective surface; and
a reflector located adjacent the light guide, wherein the lamp has a direction of illumination and the light guide is configured such that light emitted from each of the LED light sources enters the light guide and is reflected and substantially collimated at the primary reflective surface, is reflected and substantially collimated at the secondary reflective surface, and is reflected at the tertiary reflective surface in turn and exits from the light guide toward the reflector as light guide exit light, the reflector being configured to reflect the light guide exit light substantially in the direction of illumination of the lamp.

2. The LED lamp according to claim 1, wherein the primary reflective surface is a paraboloidal curved surface having a focus substantially on at least one of the LED light sources, the secondary reflective surface is an oblique curved surface configured to receive the light reflected from the primary reflective surface and direct it toward the tertiary reflective surface, the tertiary reflective surface is an oblique curved surface configured to receive the light reflected from the secondary reflective surface and direct it toward the reflector, the reflector is provided about the tertiary reflective surface and configured as an oblique curved surface that receives the light reflected from the tertiary reflective surface and directs it substantially in the direction of illumination of the lamp.

3. The LED lamp according to claim 1, wherein the light emitted from the LED light sources includes light of at least two types.

4. The LED lamp according to claim 3, wherein the LED light sources are formed in groups of LEDs, wherein each group of LEDs emitting light of the same type can be individually power controlled.

5. The LED lamp according to claim 1, wherein the light guide includes a first light guide portion formed at an angle with respect to the direction of illumination of the lamp, and a second light guide portion formed substantially in parallel with the direction of illumination of the lamp,
the first light guide portion including the primary reflective surface,
the second light guide portion including the tertiary reflective surface and protruding toward a front of the lamp and in the direction of illumination relative to the first light guide portion.

6. The LED lamp according to claim 2, wherein the light emitted from the LED light sources includes light of at least two types.

7. The LED lamp according to claim 1, wherein the light emitted from the LED light sources is all the same type of light.

8. The LED lamp according to claim 2, wherein the light emitted from the LED light sources is all the same type of light.

9. The LED lamp according to claim 3, wherein the at least two types of light includes a first color light and a second color light that is different from the first color light.

10. The LED lamp according to claim 1 wherein the light guide includes a first light guide portion that is elongate in a direction substantially perpendicular to the direction of illumination of the lamp, and includes a second light guide portion that is elongate in a direction substantially parallel to the direction of illumination of the lamp.

11. The LED lamp according to claim 10 wherein the first light guide portion is configured in a substantially disc shape having a central axis extending along the direction of illumination of the lamp, and the second light guide portion extends along the central axis of the first light guide portion.

12. The LED lamp according to claim 11 wherein the LED light sources are located about a periphery of the disc shaped first light guide portion.

13. The LED lamp according to claim 1 wherein the light source guide is made from a transparent resin material.

14. An LED lamp having a direction of illumination, comprising:
a plurality of LED light sources;
a light guide located adjacent the LED light sources and having a first light guide portion that is elongate in a direction that is angled with respect to the direction of illumination of the lamp, and a second light guide portion that is elongate in a direction that is angled with respect to the elongate direction of the first light guide portion, the first light guide portion configured to receive light emitted from the plurality of LED light sources, to substantially collimate the received light into a first collimated light that travels in a first direction, and to change the direction of the first collimated light into a second different direction as second collimated light, the second light guide portion configured to receive the second collimated light and to change the direction of the second collimated light into a third different direction as third light; and
a reflector located adjacent to the light guide and configured to receive the third light and reflect the third light into another direction different from the third direction and substantially parallel to the illumination direction of the lamp.

15. The LED lamp of claim 14, wherein the light guide includes a primary reflective surface configured to collimate the light received from the LED light sources into the first direction, a secondary reflective surface configured to reflect the first collimated light into the second different direction, and a tertiary reflective surface configured to reflect the second collimated light into the third different direction.

16. The LED lamp of claim 14, wherein the first light guide portion is elongate in a direction substantially perpendicular to the illumination direction of the lamp, and the second light guide portion is elongate in a direction substantially parallel to the illumination direction of the lamp.

17. The LED lamp of claim 14, wherein the light reflected by the reflector is emitted from the lamp in the form of a geometric figure.

18. The LED lamp of claim 17, wherein the geometric figure is a circle.

19. The LED lamp of claim 17, wherein the geometric figure is a plurality if concentric circles.

20. The LED of claim 1, wherein the light emitted from the LED light sources is transmitted through the light guide along an optical path that traces a path from the primary reflective surface at which the light is substantially collimated and travels until it is reflected by the tertiary reflective surface.

* * * * *